United States Patent
Ohtsu

(10) Patent No.: US 7,178,832 B2
(45) Date of Patent: Feb. 20, 2007

(54) TELESCOPING STEERING COLUMN ASSEMBLY WITH BRAKE

(75) Inventor: Hitonobu Ohtsu, Tokyo (JP)

(73) Assignee: Delphi Technologies, Inc., Troy, MI (US)

( * ) Notice: Subject to any disclaimer, the term of this patent is extended or adjusted under 35 U.S.C. 154(b) by 277 days.

(21) Appl. No.: 10/751,866

(22) Filed: Jan. 6, 2004

(65) Prior Publication Data

US 2005/0146124 A1 Jul. 7, 2005

(51) Int. Cl.
*B62D 1/18* (2006.01)
(52) U.S. Cl. .................................. 280/775; 74/493
(58) Field of Classification Search ............... 280/775; 74/493
See application file for complete search history.

(56) References Cited

U.S. PATENT DOCUMENTS

| | | | |
|---|---|---|---|
| 3,491,614 A | 1/1970 | Saunders et al. | |
| 3,955,439 A * | 5/1976 | Meyer | 74/493 |
| 4,195,535 A | 4/1980 | Broucksou | 74/493 |
| 5,148,717 A | 9/1992 | Yamaguchi | 74/493 |
| 5,306,032 A | 4/1994 | Hoblingre et al. | 280/775 |
| 5,524,927 A * | 6/1996 | Toussaint | 280/777 |
| 5,562,307 A | 10/1996 | Connor | 280/777 |
| 5,570,610 A | 11/1996 | Cymbal | 74/493 |
| 5,626,363 A | 5/1997 | Rispeter et al. | |
| 5,700,032 A | 12/1997 | Fukunaga | 280/775 |
| 5,743,150 A | 4/1998 | Fevre et al. | 74/493 |
| 5,769,453 A | 6/1998 | Peitsmeier et al. | 280/775 |
| 5,772,244 A * | 6/1998 | Park | 280/780 |
| 5,845,936 A | 12/1998 | Higashino | 280/775 |
| 5,927,152 A | 7/1999 | Marzio et al. | 74/493 |
| 5,941,129 A | 8/1999 | Anspaugh et al. | 74/493 |
| 5,979,265 A | 11/1999 | Kim et al. | |
| 5,992,263 A | 11/1999 | Bleuel et al. | 74/493 |
| 6,139,057 A | 10/2000 | Olgren et al. | 280/775 |
| 6,276,719 B1 * | 8/2001 | Gartner | 280/775 |
| 6,357,318 B1 | 3/2002 | Koellisch et al. | 74/493 |
| 6,419,269 B1 | 7/2002 | Manwaring et al. | 280/775 |
| 6,450,531 B1 | 9/2002 | Rinker et al. | 280/775 |
| 6,467,807 B2 | 10/2002 | Ikeda et al. | 280/775 |

FOREIGN PATENT DOCUMENTS

| | | | |
|---|---|---|---|
| GB | 2 263 756 A * | 8/1993 | |
| JP | 2002067977 A * | 3/2002 | |
| WO | 03/035451 | 5/2003 | |

* cited by examiner

*Primary Examiner*—Ruth Ilan
(74) *Attorney, Agent, or Firm*—Michael D. Smith

(57) ABSTRACT

A telescoping steering column assembly of the present invention includes a lower jacket disposed in telescoping relationship within an upper jacket along a longitudinal axes, and a brake supported by the upper jacket for frictional engagement with the lower jacket. The brake presents an inclined surface sloping longitudinally of the jackets. A cam device of the assembly is rotatable into and out of engagement with the inclined surface. The cam device includes a lever to move the brake upwardly, to engage the lower jacket with the upper jacket, and downwardly, to disengage the jackets in different modes of operation of the assembly.

7 Claims, 5 Drawing Sheets

TELESCOPING STEERING COLUMN ASSEMBLY WITH BRAKE

BACKGROUND OF THE INVENTION

1. Field of the Invention

The subject invention relates to a vehicle steering column of the type having telescoping jackets to adjust the position of a steering wheel connected to the vehicle steering column to accommodate the driver.

2. Description of the Prior Art

A telescoping steering column assembly typically uses two jackets, wherein one jacket is fixed to a frame of a vehicle body, and the other jacket is adapted to be translated with respect to the jacket fixed to the frame, thereby providing relative longitudinal movement between the two jackets with respect to one another. These jackets, engaged one within the other in a telescoping fashion, allow the driver to push or pull the steering wheel to a desired position and then to lock the telescoping column.

Various configurations and designs are available in the prior art for linear guide mechanism for adjusting telescoping steering column assemblies and have been disclosed in U.S. Pat. No. 5,306,032 to Hoblingre et al., U.S. Pat. No. 5,562,307 to Connor, U.S. Pat. No. 5,700,032 to Fukunada, U.S. Pat. No. 5,743,150 to Fevre et al., U.S. Pat. No. 5,845,936 to Higashino, U.S. Pat. No. 5,927,152 to Marzio et al., U.S. Pat. No. 5,941,129 to Anspaugh et al., and U.S. Pat. No. 6,450,531 to Rinker et al. Another prior art design includes a locking mechanism with a pad and a locking bolt to abut the pad and to displace the pad in a lateral direction to lock the jackets engaged one within the other in the telescoping fashion. The locking mechanism requires expensive multi-lead thread for both the locking bolt (male thread) and one of the jackets (female thread) in order to provide a mechanical engagement between the pad and the locking bolt and to move the locking bolt inwardly to and outwardly from the pad in operation of the locking mechanism. In addition, this locking mechanism includes a boss section integral with and extending outwardly from the side of the jacket thereby increasing a size of the telescoping steering column assembly.

Although the prior art configurations of the locking mechanism for the telescoping steering column assembly are used in the automotive industry today, there remains a constant need to improve the mechanism that generates a locking force to prevent the relative longitudinal position between the two jackets of the telescoping steering column assembly.

BRIEF SUMMARY OF INVENTION

A telescoping steering column assembly of the present invention includes an upper jacket, a lower jacket disposed in telescoping relationship within the upper jacket along a longitudinal axis, and a brake supported by the upper jacket for frictional engagement with the lower jacket. The telescoping steering column assembly includes a cam device for moving the brake into frictional engagement with the lower jacket. The brake presents an inclined surface sloping longitudinally of the jackets with the cam device rotatable into and out of engagement with the inclined surface.

An advantage of the present invention is to provide the brake with inclined surface that maintains proper frictional engagement between the upper and lower jackets.

Another advantage of the present invention is to provide a locking mechanism having all components symmetrically mounted on the bottom of the fixed jacket thereby contributing to the compactness of the assembly.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
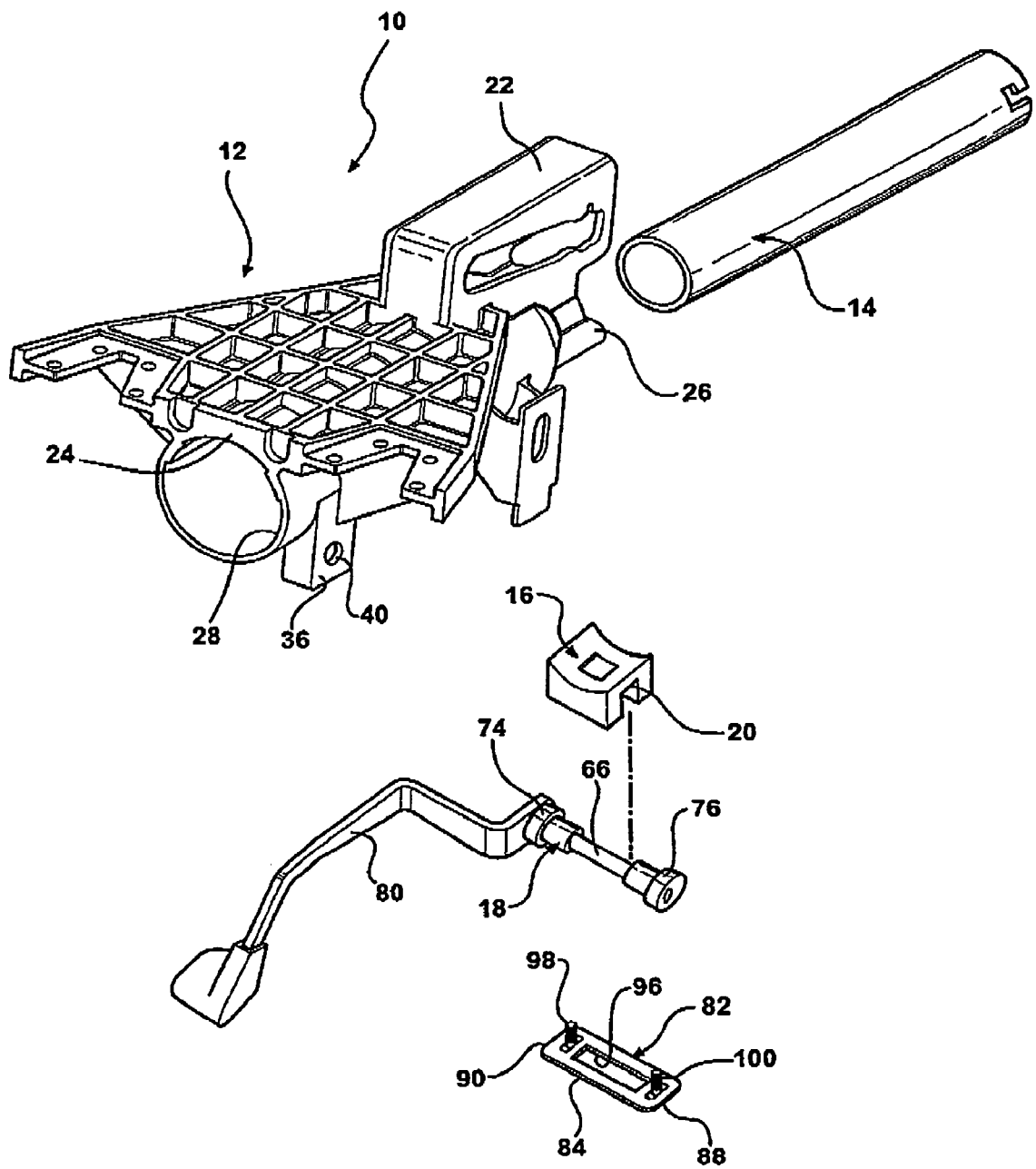
FIG. 1 is an exploded perspective view of a telescoping steering column assembly of the present invention.

Referring to the Figures wherein like numerals indicate like or corresponding parts throughout the several views, a telescoping steering column assembly of the present invention is generally shown at 10.

The telescoping steering column assembly 10 includes a upper jacket, generally indicated at 12, a lower jacket 14, disposed in telescoping relationship within the upper jacket 12 along a longitudinal axes A, and a brake, generally indicated at 16, supported by the upper jacket 12 for frictional engagement with the lower jacket 14. The telescoping steering column assembly 10 includes a cam device, generally indicated at 18, for moving the brake 16 into frictional engagement with the lower jacket 14, shown in FIGS. 2 and 3. The brake 16 presents an inclined surface 20 sloping longitudinally of the jackets 12, 14 with the cam device 18 rotatable into and out of engagement with the inclined surface 20.

The upper jacket 12 of the present invention includes a body 22 having leading 24 and trailing 26 ends and opening 28 of a generally circular configuration as viewed in cross section. The opening 28 extends axially from the leading 24 to the trailing 26 ends of the upper jacket 12. The upper jacket 12 includes a cavity 30 of a generally rectangular configuration, defined within the body 22 at the leading end 24. The upper jacket 12 further includes at least one integral projection 32 extending from the body 22 to the opening 28 and two walls 34, 36 integral with and spaced from one the other and extending downwardly from the body 22 of the upper jacket 12 at the leading end 24. Each walls 34, 36 includes a hole 38, 40, respectively, of a generally circular configuration aligned with respect to one the other.

Figure 5:
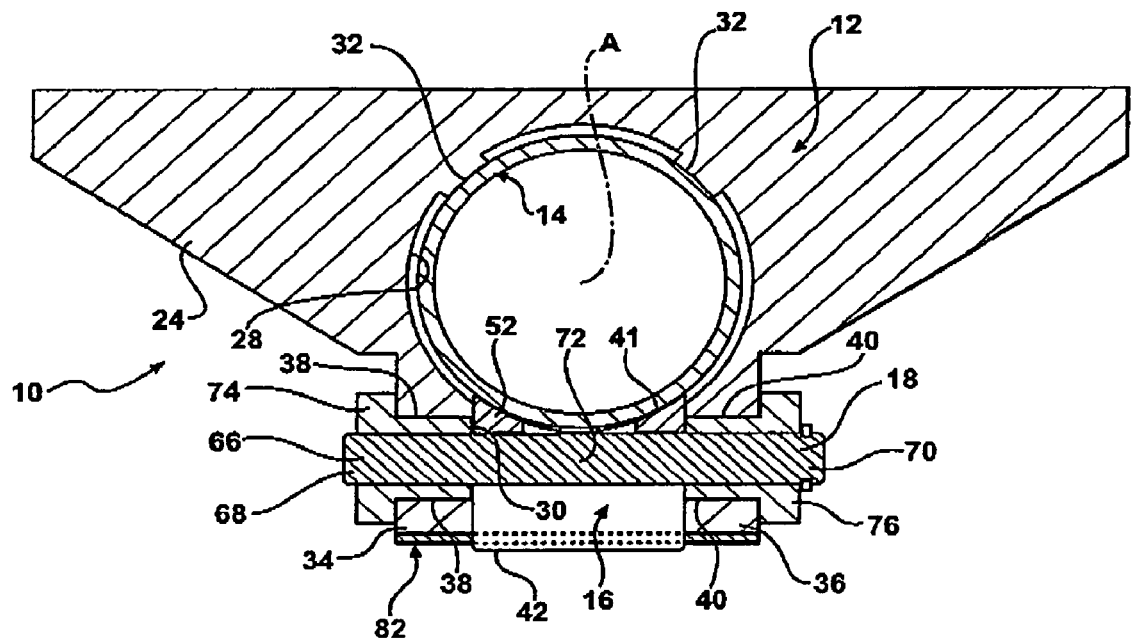
FIG. 5 is a cross sectional view of the telescoping steering column assembly showing the brake extending inwardly through the upper jacket to engage a lower jacket disposed therewithin.
Figure 6:
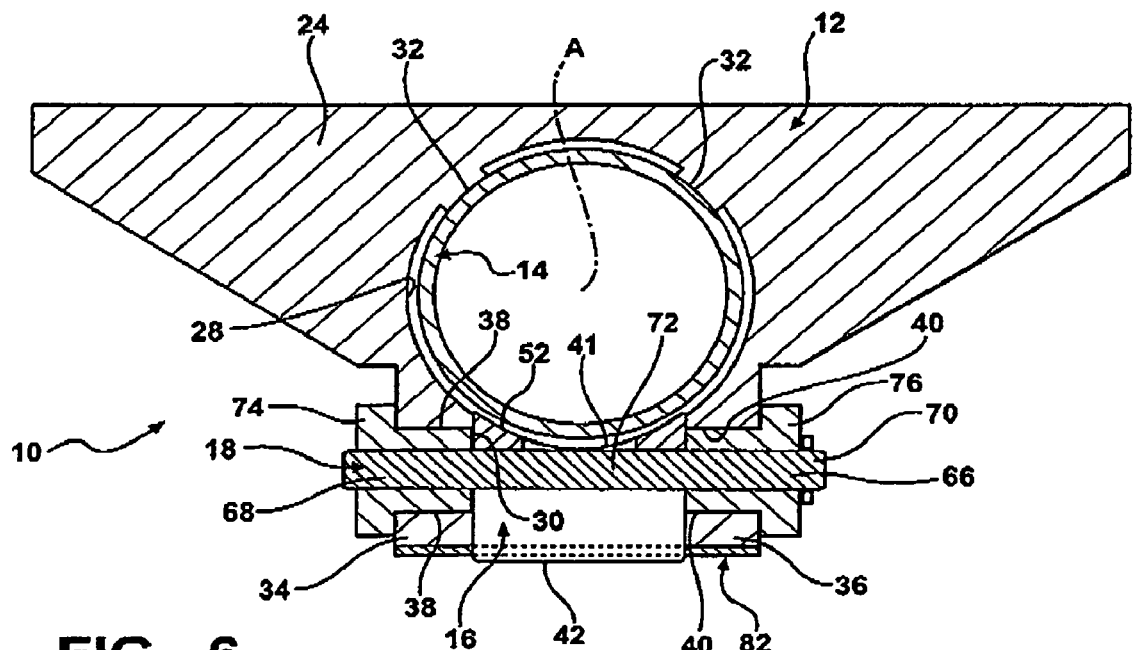
FIG. 6 is another cross sectional view of the telescoping steering column assembly similar to FIG. 5, but showing the brake extending downwardly from the lower jacket disposed within the upper jacket and to disengage the lower jacket from the upper jacket.
Figure 7:
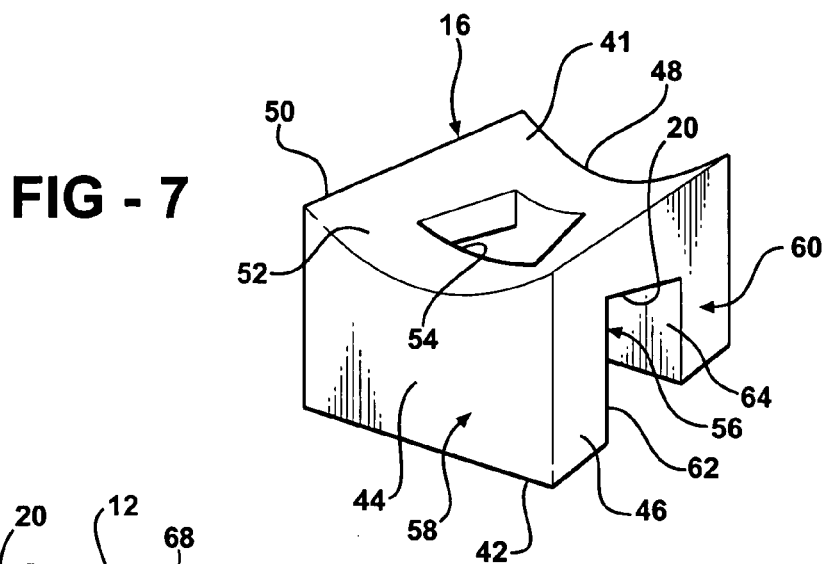
FIG. 7 is a perspective view of the brake.

Referring to FIGS. 5 and 6, the brake 16 is supported between the walls 34, 36 and extends through the cavity 30 defined within the body 22 to react with the lower jacket 14 and to force the lower jacket 14 into engagement with the upper jacket 12 to prevent relative longitudinal movements between the jackets 12, 14. The brake 16 includes top 41, bottom 42 and side walls 44, 46, 48, and 50, as shown in FIG. 7. The top 41 of the brake 16 includes a recess 52 complementary to the lower jacket 14 and a cavity 54 of a generally rectangular configuration defined within the top 41. The bottom 42 of the brake 16 is further defined by a U-shaped opening, generally indicated at 56, disposed horizontally between two of the side walls 46, 50 to divide the brake 16 into two sections, generally indicated at 58, 60, and separated by the U-shaped opening 56. Each section 58, 60 includes an inner surface 62, 64, respectively, interconnected by the inclined surface 20 sloping longitudinally of the upper 12 and lower 14 jackets.

Figure 8:
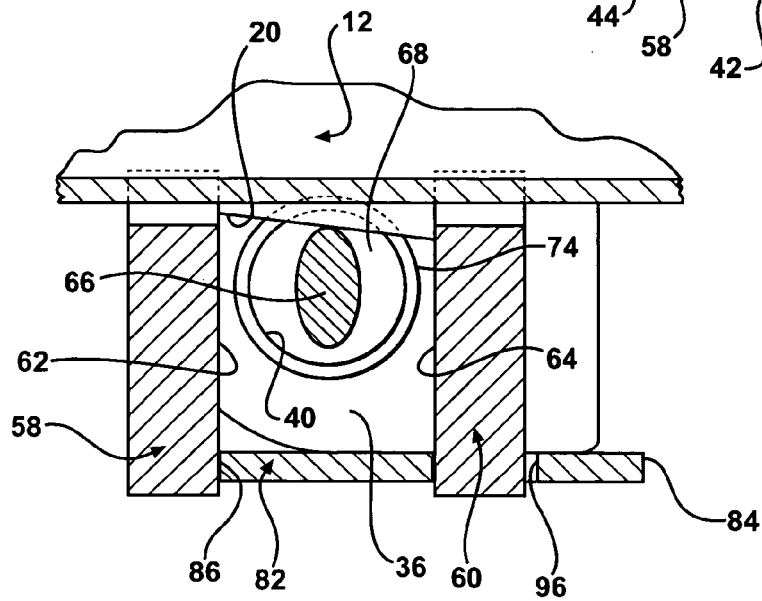
FIG. 8 is a cross sectional fragmental view taken from a side of the upper jacket showing the brake in a locked position.
Figure 9:
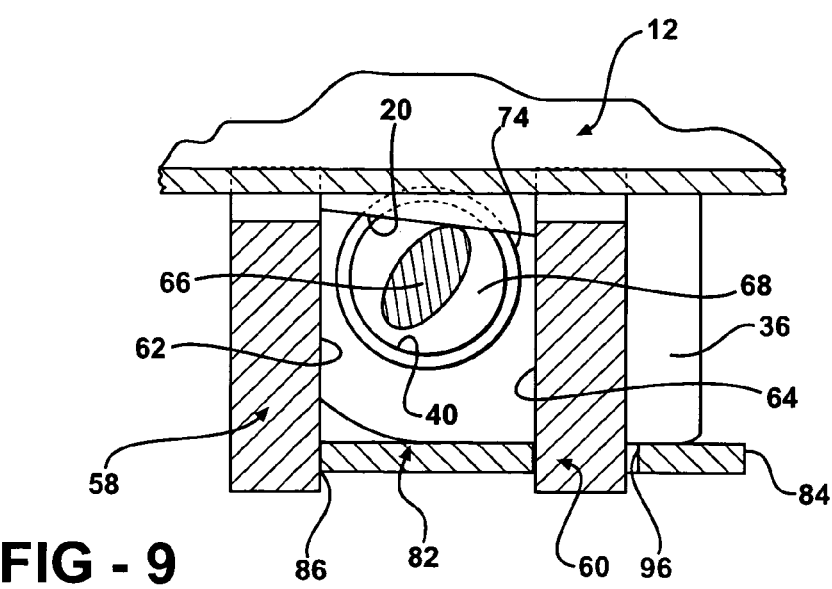
FIG. 9 is another cross sectional fragmental view of FIG. 8 showing the brake in an unlocked position.

Referring back to FIGS. 2 and 3, the cam device 18 of the present invention includes a bar 66 extending through the walls 34, 36 and across the U-shaped opening 56 of the brake 16. The bar 66 includes terminal ends 68, 70 of a generally circular configuration, as viewed in cross section, and a middle portion 72 of a generally elliptical configuration, as viewed in cross section, disposed between the terminal ends 68, 70. The middle portion 72 of the bar 66 rotates against the inclined surface 20 of the brake 16 to move the brake 16 into frictional engagement with the lower jacket 14. The cam device 18 includes bushings 74, 76 disposed annularly about each of the terminal ends 68, 70 of the bar 66. The bushings 74, 76 are disposed within the holes 38, 40 of the walls 34, 36 integral with the upper jacket 12. Referring to FIGS. 8 and 9, the cam device 18 includes a lever 80 attached to the bar 66 at one of the terminal ends 68 to rotate he bar 66 within the walls 34, 36 and the U-shaped opening 56 of the brake 16 and to move the brake 16 upwardly, to engage the lower jacket 14 with the upper jacket 12, and downwardly, to disengage the jackets 12, 14 in different modes of operation of the assembly 10.

Figure 2:
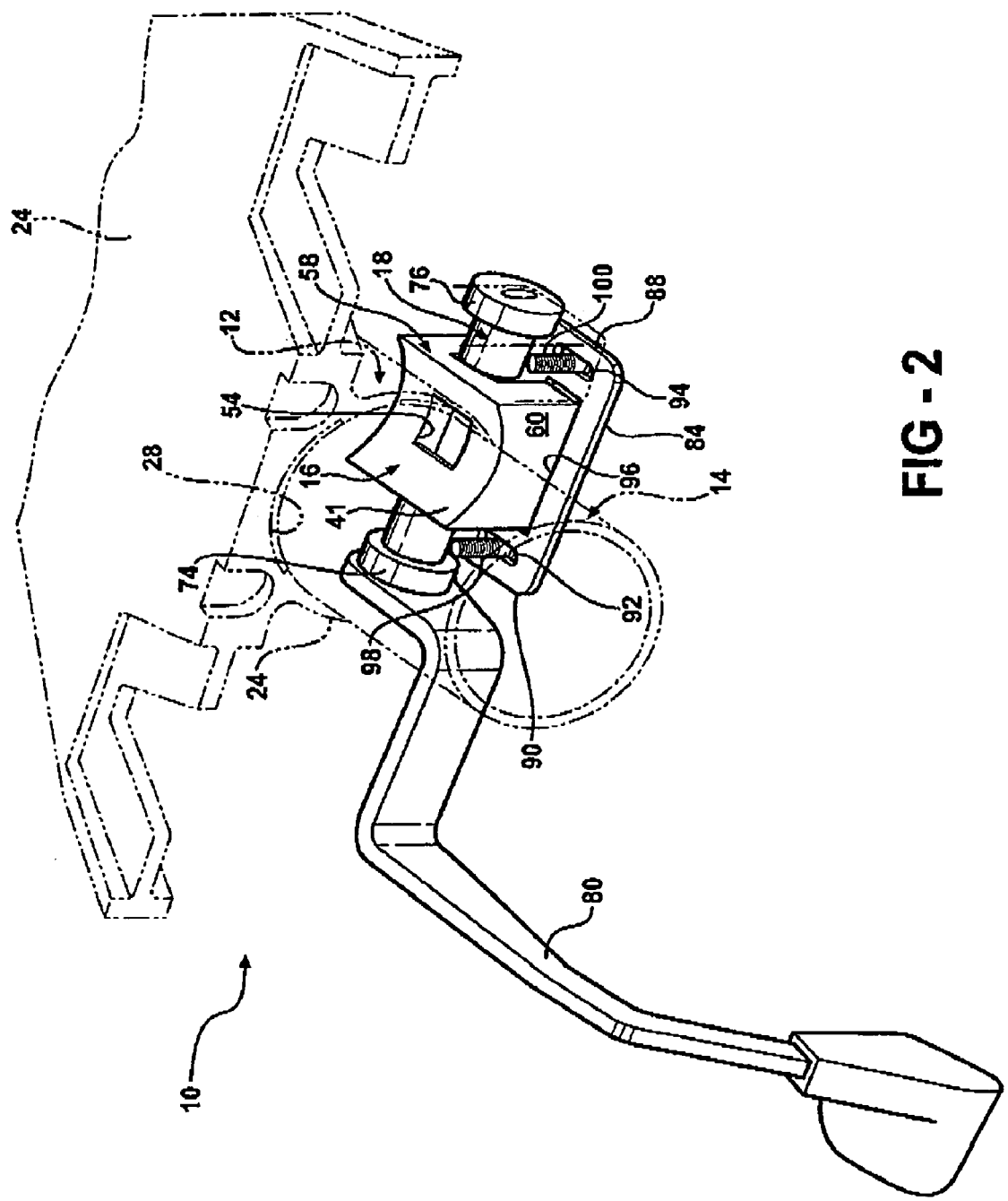
FIG. 2 is perspective top view of a brake and a cam device of the present invention.
Figure 3:
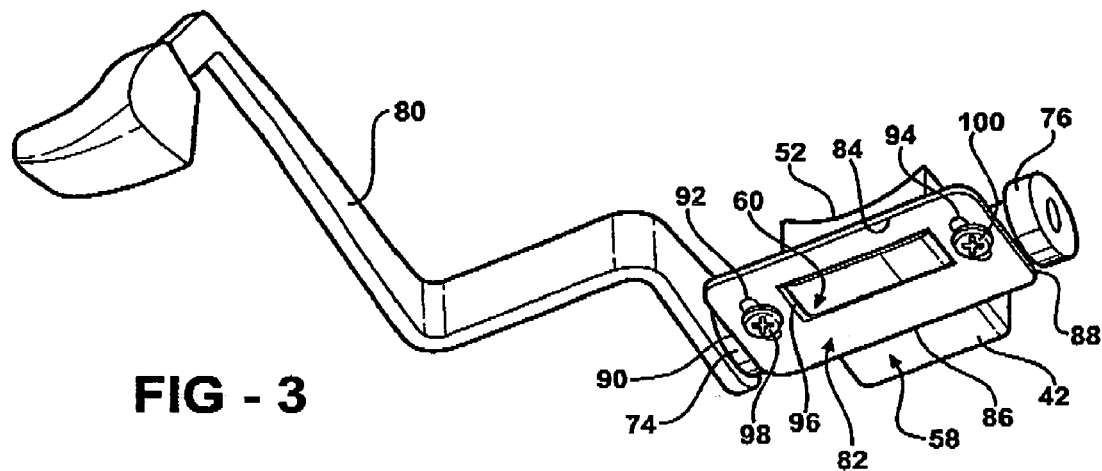
FIG. 3 is a perspective bottom view of the brake and the cam device shown in FIG. 2.
Figure 4:
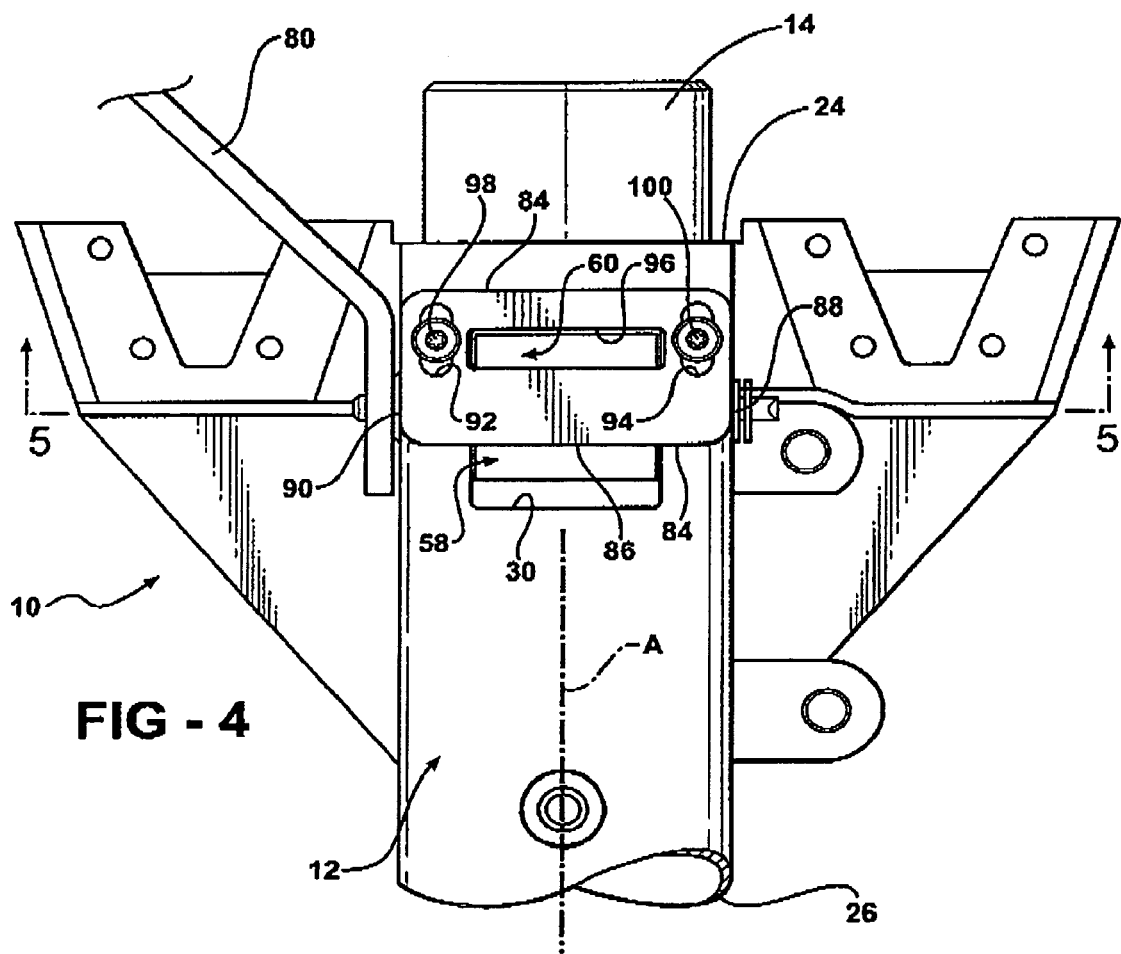
FIG. 4 is a bottom view of the telescoping steering column assembly of the present invention.

Referring back to FIGS. 2 through 6, the telescoping steering column assembly 10 includes a plate, generally indicated at 82, to hold the brake 16 within the walls 34, 36 of the upper jacket 12. The plate 82 includes a generally rectangular configuration and has front 84, rear 86 and terminal ends 88, 90. The plate 82 also includes an elongated slot 92, 94 at each of the terminal ends 88, 90 and a recess 96 of a generally rectangular configuration that extends between the elongated slots 92, 94 at the front 84 of the plate 82. The recess 96 is designed to engage one of the sections 60 of the brake 16, when the brake is retracted outwardly from the upper and lower jackets. To connect the plate 82 to the upper jacket 12, the invention includes a plurality of fasteners 98, 100, as shown in FIGS. 2 and 3, extending through the elongated slots 92, 94 to connect the plate 82 to the upper jacket 12, as best shown in FIG. 4.

Obviously, many modifications and variations of the present invention are possible in light of the above teachings. The invention may be practiced otherwise than as specifically described within the scope of the appended claims. These antecedent recitations should be interpreted to cover any combination in which the incentive novelty exercises its utility.

What is claimed is:

1. A telescoping steering column assembly comprising:
an upper jacket having a body and leading and trailing ends and an opening of a generally circular configuration as viewed in cross section, wherein said opening extends longitudinally from said leading to said trailing ends of said upper jacket and a cavity defined within said body at said leading end;
said upper jacket including at least one integral projection extending from said upper jacket to said opening;
said upper jacket including two walls integral with and extending downwardly from said body and each of said walls including a hole of a generally circular configuration aligned with respect to one the other;
said walls defining a gap therebetween;
a plate of a generally rectangular configuration including front, rear and terminal ends;
said plate including an elongated slot at each of said terminal ends and a recess of a generally rectangular configuration extending between said slots at said front of said plate;
a plurality of fasteners extending through said slots, respectively, to connect said plate to said upper jacket;
a lower jacket disposed in telescoping relationship within said opening of said upper jacket;
a brake disposed between said walls and extending through said cavity defined within said body of said upper jacket, said brake including top and side walls;
said top of said brake including a recess complementary to said lower jacket and a cavity of a generally rectangular configuration defined therewithin;
said bottom of said brake being further defined by a U-shaped opening extending horizontally between side walls to divide said brake into two sections separated by said U-shaped opening to further define an inner surface of one of said sections and an inner surface of another section interconnected by an inclined surface sloping inwardly to said jackets;
a cam device including a bar having terminal ends of a generally circular configuration, as viewed in cross section, and a middle portion of a generally elliptical configuration, as viewed in cross section, disposed between said terminal ends to abut with said inclined surface of said brake;
bushings disposed annularly about each of said terminal ends of said bar, respectively, said bushings disposed within said holes of said walls integral with said upper jacket; and
a lever attached to said bar at said terminal end for rotating said bar within said walls and said U-shaped opening of said brake to move said brake upwardly and downwardly in different modes of operation of said assembly.

2. A telescoping steering column assembly comprising:
an upper jacket including two walls integral with and spaced from one another and extending downwardly therefrom;
a lower jacket disposed in telescoping relationship within said upper jacket along a longitudinal axis;
a brake supported by said walls of said upper jacket for frictional engagement with said lower jacket;
a cam device for moving said brake into frictional engagement with said lower jacket; and
said brake presenting an inclined surface sloping longitudinally of said jackets with said cam device rotatable into and out of engagement with said inclined surface and said brake including top and side walls and having a U-shaped opening disposed between said side walls dividing said brake into two sections spaced one from the other having respective inner surfaces interconnected by said inclined surface.

3. A telescoping steering column assembly as set forth in claim 2 wherein said cam device includes a bar extending through said walls and across said U-shaped opening and having terminal ends and a middle portion disposed between said terminal ends to rotate against said inclined surface.

4. A telescoping steering column assembly as set forth in claim 3 wherein said middle portion of said bar has a generally elliptical configuration, as viewed in cross section.

5. A telescoping steering column assembly as set forth in claim 4 wherein said upper jacket includes a cavity defined therewithin to receive said brake extending thereto for engaging with said lower jacket.

6. A telescoping steering column assembly as set forth in claim 5 including a plate connected to said walls and having front, rear and terminal ends, said plate including a recess to receive one of said sections of said brake.

7. A telescoping steering column assembly as set forth in claim 6 including a lever attached to said bar at one of said terminal ends for rotating said bar upwardly and downwardly in different modes of operation of said assembly.

* * * * *